United States Patent
Amin-Sanayei et al.

(10) Patent No.: US 8,809,471 B2
(45) Date of Patent: Aug. 19, 2014

(54) SYNTHESIS OF MAKING 2,3,3,3-TETRAFLUOROPROPENE CONTAINING FLUOROPOLYMERS

(75) Inventors: Ramin Amin-Sanayei, Malvern, PA (US); Caiping Lin, West Hartford, CT (US); Cedric Airaud, Orsay (FR)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/003,050

(22) PCT Filed: Mar. 15, 2012

(86) PCT No.: PCT/US2012/029170
§ 371 (c)(1),
(2), (4) Date: Sep. 4, 2013

(87) PCT Pub. No.: WO2012/125788
PCT Pub. Date: Sep. 20, 2012

(65) Prior Publication Data
US 2013/0345381 A1    Dec. 26, 2013

Related U.S. Application Data

(60) Provisional application No. 61/453,335, filed on Mar. 16, 2011.

(51) Int. Cl.
*C08F 214/22* (2006.01)
*C08F 14/18* (2006.01)
(52) U.S. Cl.
USPC .............................. 526/73; 626/225; 626/234
(58) Field of Classification Search
USPC ........................................... 526/73, 225, 234
See application file for complete search history.

(56) References Cited

U.S. PATENT DOCUMENTS

| | | | |
|---|---|---|---|
| 2,970,988 A | 2/1961 | Lo | |
| 3,085,996 A | 4/1963 | Lo | |
| 3,493,530 A | 2/1970 | Sianesi et al | |
| 4,128,517 A | 12/1978 | Kydonieus | |
| 4,946,900 A | 8/1990 | Blaise et al. | |
| 6,512,063 B2 | 1/2003 | Tang | |
| 6,586,547 B1 | 7/2003 | Amin-Sanayei et al. | |
| 6,693,152 B2 | 2/2004 | Kaspar et al. | |
| 6,794,550 B2 | 9/2004 | Hintzer et al. | |
| 6,818,258 B2 | 11/2004 | Kaneko et al. | |
| 7,074,862 B2 | 7/2006 | Kaspar et al. | |
| 7,803,890 B2 * | 9/2010 | Samuels et al. | 526/252 |
| 2004/0260022 A1 | 12/2004 | Amos et al. | |
| 2006/0135716 A1 | 6/2006 | Hung et al. | |
| 2008/0153977 A1 * | 6/2008 | Samuels et al. | 525/53 |
| 2008/0171844 A1 * | 7/2008 | Samuels et al. | 526/255 |
| 2009/0221776 A1 | 9/2009 | Durali et al. | |
| 2011/0040021 A1 | 2/2011 | Kaspar et al. | |
| 2011/0097529 A1 * | 4/2011 | Durali et al. | 428/36.9 |

FOREIGN PATENT DOCUMENTS

WO   WO-2010/005757 A1 *   1/2010
WO   WO-2012/125788 A2 *   9/2012

* cited by examiner

*Primary Examiner* — Peter D. Mulcahy
*Assistant Examiner* — Henry Hu
(74) *Attorney, Agent, or Firm* — Thomas F. Roland

(57) ABSTRACT

The invention relates to a method for synthesizing 2,3,3,3-tetrafluoropropene containing fluoropolymers using non-fluorinated surfactants in an emulsion process. No fluorinated surfactants are used in the process, and a persulfate initiator is used as the primary initiator. The process produces high molecular weight copolymers.

7 Claims, No Drawings

SYNTHESIS OF MAKING 2,3,3,3-TETRAFLUOROPROPENE CONTAINING FLUOROPOLYMERS

This application claims benefit, under USC. §119 or §365 of PCT Application Number PCT/US2012/029170, filed Mar. 15, 2012, and U.S. Provisional Application No. 61/453,335, filed Mar. 16, 2011.

FIELD OF THE INVENTION

The invention relates to a method for synthesizing 2,3,3,3-tetrafluoropropene containing fluoropolymers using non-fluorinated surfactants in an emulsion process. No fluorinated surfactants are used in the process, and a persulfate initiator is used as the primary initiator. The process produces high molecular weight copolymers.

BACKGROUND OF THE INVENTION

Fluoropolymers are generally made in an aqueous media, which provides a sufficient heat sink for managing the heat of polymerization.

In order to achieve a stable dispersion or emulsion in aqueous media, a suitable surfactant or emulsifier must be employed to obtain a stable dispersion having a high yield and high molecular weight. The copolymerization of 2,3,3,3 tetrafluoropropene with vinylidene fluoride is described in U.S. Pat. No. 2,970,988, U.S. Pat. No. 3,085,996, U.S. Pat. No. 6,818,258, U.S. Pat. No. 7,803,890, US 2008153977 and WO10005757. Fluorinated-surfactants are used in forming these copolymers because they can yield stable latex and high molecular weight fluoropolymers. The fluorinated-surfactants typically used in emulsion polymerization of 2,3,3,3-tetrafluoropropene-based-polymers, such as the ammonium salt of perfluoro octanoic acid or salts of perfluoro alkyl sulfonic acids, are expensive. They also present an environmental concern related to bio-persistence and EPA is restricting their uses.

It is therefore desirable to produce copolymers of 2,3,3,3 tetrafluoropropene, without the use of fluorosurfactants without compromising the properties of the resultant fluoropolymers.

Attempts have been made to find a suitable emulsifier in place of fluorinated surfactant for polymerization of vinylidene fluoride, vinyl fluoride, trifluoroethylene, tetrafluoroethylene (TFE), chlorothrifluoroethylene (CTFE) and hexafluoropropylene (HFP) and their respected copolymers. For example, U.S. Pat. No. 6,512,063 discloses the use of the sodium salt of organic sulfonates as the non-fluorinated surfactant. WO 2007018783 formation of fluoropolymers using non-fluorinated surfactants selected from the group consisting of alkyl phosphonic acids, polyphosphonic acid, polyacrylic acids, polyvinyl sulfonic acid, and salts was described. Other references describing the use of non-fluorinated surfactants for producing fluoropolymers and fluoroelastomers include WO 02/088207, and U.S. Application 2006/0135716. None of the references disclose the polymerization of 2,3,3,3-tetrafluoropropene-based-polymers using non-fluorinated surfactants. U.S. Pat. No. 4,128,517 discloses a cleaning method for fluoropolymer dispersions produced using fluorinated-surfactants where dispersion is subjected to industrial post-treatment processes, such as coagulation, washing and drying.

Surprisingly, fluoropolymers made in accordance with the present invention can be cleaned from contaminants produced during dispersion polymerization even though not made with fluorinated surfactant. U.S. Pat. No. 6,794,550 describes a process in which fluoropolymer dispersions were synthesized in the presence of fluorinated emulsifiers. Non-ionic emulsifiers were post-added to the dispersions, and then a portion of fluorinated surfactant was removed by means of steam-volatilization at low pH. The disclosed processes could never remove all of the fluorinated surfactant; therefore, the resultant fluoropolymer dispersion is not absolutely free of fluorinated surfactant, and a portion of the fluorinated surfactant will remain in the final dispersion. Moreover, the shelf-stability of said dispersion would be considerably reduced if not totally diminished due to heating the dispersion up to the steaming point at low pH. Further, the use of fluorosurfactants in the process, even when latter removed creates a waste stream containing fluorosurfactants and the associated environmental issues.

Surprisingly it has now been found that fluoro-copolymer of 2,3,3,3-tetrafluoropropene, and especially copolymers with vinylidene fluoride can be synthesized over a wide ratio of comonomers, to produce stable emulsions of high molecular weight copolymers. The copolymers formed having excellent physical properties, including a high degree of polymerization, high melt viscosity, and high melting temperature. Surprisingly the molecular weight, as seen in the melt viscosity, is much higher than that found in similar copolymers made with fluorosurfactants. Excellent cleanliness of reactor surfaces after polymerization is complete was also noted. Additionally the copolymer has good whiteness, and retains the whiteness on aging.

SUMMARY OF THE INVENTION

The invention relates to a process for forming a copolymer of 2,3,3,3-tetrafluoropropene, comprising the step of forming an emulsion polymer by
  a) contacting in a reaction zone:
    1) from 1 to 90 wt percent of 2,3,3,3-tetrafluoropropene, based on the total weight of monomers;
    2) from 10 to 99 wt percent of one or more other fluoromonomers based on the total weight of monomers;
    3) from 0 to 50 wt percent of other ethylenically unsaturated monomers based on the total weight of monomers;
    4) a persulfate initiator as the primary initiator;
    5) 100 ppm to 2 wt percent, based on the weight of the copolymer solids, of one or more non-fluorinated surfactants,
    wherein no fluorosurfactants are used in the emulsion polymerization;
    wherein said contacting is carried out at a temperature of from 50° C. to 135° C., and at a pressure of from 1380 to 8275 kpa; and
  wherein said copolymer formed has a high molecular weight, having a melt viscosity of greater than 2 Kpoise.

DETAILED DESCRIPTION OF THE INVENTION

Unless stated otherwise, all percentages, parts, ratios, etc. are by weight, and molecular weights are weight average molecular weight.

"Fluorinated surfactant" and "fluoro-surfactant" as used herein means that the main surfactant chain contains fluorine atoms whereas in the present invention non-fluorinated surfactants means that there is no fluorine on the main chain, however the terminal groups can contain fluorine atoms.

The term "copolymer" is used herein to describe a polymer having two of more different monomer units, and could be a terpolymer, or polymer having more than three different monomer units. The copolymers formed may be heterogeneous or homogeneous, and may have a controlled architecture such as star, branch random or block copolymers.

Monomers

The invention relates to copolymers having 1 to 99 wt percent of 2,3,3,3-tetrafluoropropene monomer units and 10 to 99 weight percent of at least one other fluoromonomer units. Preferably the copolymer contains from 2 to 60 wt percent of 2,3,3,3-tetrafluoropropene monomer units. Other useful fluorinated monomers include, but are not limited to, vinylidene fluoride, tetrafluoroethylene, trifluoroethylene, chlorotrifluoroethylene, vinyl fluoride, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), perfluoromethyl vinyl ether, and perfluoropropyl vinyl ether. In a preferred embodiment, the other fluoromonomer includes vinylidene fluoride.

Optionally, from 0 to 50 weight percent, preferably from 0 to 20 weight percent, and more preferably from 0 to 10 weight percent of non-fluorinated ethylenically unsaturated monomer units are present, based on the total weight of monomer units.

In one embodiment, the copolymer is entirely composed of fluoromonomers. In a preferred embodiment, the copolymer contains only 2,3,3,3-tetrafluoropropene monomer units and vinylidene fluoride monomer units.

Emulsifiers

The polymerization uses from 100 ppm to 2 weight percent, preferably 300 ppm to 1.5 weight percent based, and most preferably from 500 ppm to 1.0 weight percent—based on the weight of the fluoropolymer solids, of one or more non-fluorinated surfactants, or blends of non-fluorinated surfactants. One key to the invention is that no fluorosurfactant is used or is present at any point during the polymerization and post-polymerization processing.

In the polymerization process, the emulsifier could be added all upfront prior to polymerization, fed continuously during the polymerization, fed partly before and then during polymerization, or fed after polymerization started and progressed for a while.

Non-ionic surfactants useful in the present invention include, but are not limited to:

i) non-ionic block copolymers with formula of

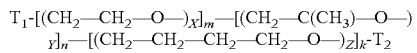

wherein, X, Y, and Z are between 2 to 200; and m, n, k are from 0 to 5, $T_1$ and $T_2$ are terminal groups selected from hydrogen, hydroxyl, carboxyl, ester, ether and/or hydrocarbon, including but not limited to polyethylene glycol acrylate (PEGA), polyethylene glycol (PEG), and polyethylene glycol octyl-phenyl ether (Triton X-100), polypropylene glycol acrylate (PPGA), polypropylene glycol (PPG), polyethylene glycol methacrylate (PEG-MA), dimethyl polyethylene glycol (DMPEG), polyethylene glycol butyl ether (PEGBE), polypropylene glycol methacrylate (PPG-MA), polypropylene glycol di-methacrylate (PPG-DMA), and polytetramethylene glycol (PTMG);

ii) alkyl phosphonic acids, polyvinylphosphonic acid, polyacrylic acid, polyvinyl sulfonic acid, and the salts thereof;

iii) alkanesulfonate selected from C7-C20 linear 1-alkanesulfonates, C7-C20 linear 2-alkanesulfonates, C7-C20 linear 1,2-alkanedisulfonates, and mixtures thereof;

iv) alkyl sulfate surfactants such as R—SO$_4$M, and MO$_4$S—R—SO$_4$M;

where R is a hydrocarbon group, and M is a monovalent cation selected. Examples are sodium laurel sulfate, potassium laurel sulfate, ammonium laurel sulfate, and mixtures thereof; and v) siloxane-based surfactants.

The initiator of the invention is primarily a persulfate initiator, including sodium, potassium or ammonium persulfate. By "primarily persulfate initiator" as used herin is meant that at least 80% by weight of the initiator, and preferably 90% by weight of the total initiator is made up of one or more. Preferably, the only initiator is a persulfate initiator, though low levels of a co-initiator may be used. Other useful initiators are for example, organic persulfides initiators.

In addition to the monomers, initiator, and surfactant, other typical additives used in the emulsion polymerization of fluoromoners may be added at typical levels. The additives include, but are not limited to chain transfer agents, paraffin antifoulants, and buffering agents.

The process of the invention can be a batch, semi-batch or continuous polymerization process. An emulsion process is preferred, though a suspension process may also be used. The reactor is a pressurized polymerization reactor preferably a horizontal polymerization reaction equipped with a stirrer and heat control means. The temperature of the polymerization can vary depending on the characteristics of the initiator used, but it is typically between 50° and 135° C., and most conveniently it is between 70° and 120° C. The temperature is not limited to this range, however, and might be higher or lower if a high-temperature or low-temperature initiator is used. The pressure of the polymerization is typically between 1380 and 8275 kPa, but it can be higher if the equipment permits operation at higher pressure. The pressure is most conveniently between 3450 and 5520 kPa.

In an emulsion polymerization process, a reactor is charged with deionized water, water soluble non-fluorinated surfactant capable of emulsifying the reactor mass during polymerization. The reactor and its contents are then deoxygenated while stirring. The reactor and contents are heated to the desired temperature and 2,3,3,3-tetrafluoropropene, and other monomers (preferably vinylidene fluoride), and optionally, chain transfer agents to control copolymer molecular weight are added. When the desired reaction pressure is reached, initiator is introduced to start polymerization and maintain the reaction.

The dispersion formed by the process of the invention has a solids level of from 5 to 65 weight percent, preferably from 10 to 55 weight percent. The fluoropolymer particles in the dispersion have a particle size in the range of 50 to 500 nm, and preferably from 100-350 nm The melt viscosity of disclosed polymers are from 0.5 to 60 kilo poise, preferably from 2 to 50 kilo poise, and more preferably from 2-40 kilo poise measured by capillary rheometry at 230° C. and 100 sec$^{-1}$ according to method of ASTM-D3835.

The process of the invention is generally illustrated by the following Examples. One of skill in the art will recognize useful variations of these Examples that could be performed, based on the disclosure of the invention.

Examples 1-5

To a 1.7 liter agitated-autoclave reactor was added one liter of DI-water along with 1.5 g of non-fluorinated surfactants as shown in Table 1. The mixture was purged with argon or nitrogen and then heated to a temperature of 83° C. The reactor was then charged with VF2 and 2,3,3,3-tetrafluoropropene to reach a pressure of 4510 kPa. Initiator solution was an aqueous solution comprised 1% potassium persulfate (from EMD Chemicals, ACS grade) and 1% sodium acetate trihydrate (from Mallinckrodt Chemicals, ACS grade). The initiator solution was added to the reactor to initiate the polymerization. When the pressure in the autoclave dropped by 150-200 psi, polymerization was stopped by turning the agitator off. After cooling to room temperature, the reactor was emptied. Gravimetric solids and particle size measurements of the latex were conducted. The particle size of the dispersion was determined using a Nicomp Model 380 Sub-Micron Particle Sizer including single mode 35 mW Laser diode with wavelength of 639 nm. Results are tabulated in the Table 1.

TABLE 1

|   | Surfactant Type | VDF feed (g) | 1234 yf feed (g) | KPS used (g) | Solids % | Particle size (nm) |
|---|---|---|---|---|---|---|
| 1 | 31R1 | 119.8 | 14.7 | 0.59 | 9.0 | 129.1 |
| 2 (comp) | SDS | 112.8 | 32.0 | 1.55 | 6.4 | 62.0 |
| 3 | SOS | 112.4 | 32.0 | 0.44 | 10.6 | 255.1 |
| 4 | PAA | 112.3 | 36.8 | 0.44 | 11.3 | 164.8 |

SDS: Sodium n-Dodecyl Sulfate,
SOS: 1-Octanesulfonic Acid Sodium Salt Monohydrate.
PAA: Polyacrylic Acid, Lubrizol K732
31R1: Polypropylene glycol-block-polyethylene glycol-block-polypropylene glycol (Pluronic 31R1, BASF)

Examples 5-8

To a 1.7 liter agitated-autoclave reactor was added one liter of DI-water along with 1.5 g of non-fluorinated non-ionic block copolymer surfactants of Polypropylene glycol-block-polyethylene glycol-block-polypropylene glycol (PLURONIC 31R1 by BASF). The mixture was purged with argon or nitrogen and then heated to a temperature of 83° C. The reactor was then charged with VF2 and 2,3,3,3-tetrafluoropropene to reach a pressure of 4510 kPa. Initiator solution was aqueous solution comprised 1% potassium persulfate (from EMD Chemicals) and 1% sodium acetate trihydrate (from Mallinckrodt Chemicals, ACS grade). A continuous feed of the aqueous initiator solution was added to the reaction and the pressure was maintained at 4480 kPa by adding as needed VDF and 2,3,3,3-tetrafluoropropene. After the pre-determined amount of VF2 in the reactor was reached, addition of monomers and initiator were stopped but reaction continue till the pressure in the reactor was dropped to 300 psi. After cooling to room temperature, the reactor was emptied. Gravimetric solids and particle size measurements of the latex were conducted. The particle size of the dispersion was determined using a Nicomp Model 380 Sub-Micron Particle Sizer including single mode 35 mW Laser diode with wavelength of 639 nm. Melt viscosity measurements were preformed according to ASTM-D3835 by a capillary rheometry at 230° C. and 100 sec$^{-1}$. Results are tabulated in Table 2.

TABLE 2

|   | Ref number | VDF feed (g) | 1234 yf feed (g) | KPS used (g) | Solids % | Particle size (nm) | Melt Viscosity (kp) |
|---|---|---|---|---|---|---|---|
| 5 | 13252-39 | 332.1 | 56.8 | 0.84 | 25.5 | 212.4 | 26.88 |
| 6 | 13252-42 | 332.0 | 142.0 | 1.22 | 27.9 | 239.7 | 20.15 |
| 7 | 13252-43 | 332.0 | 170.4 | 1.36 | 28.9 | 245.1 | 18.46 |
| 8 | 13252-45 | 332.3 | 227.3 | 1.28 | 31.4 | 248.4 | 18.42 |

What is claimed is:

1. A process for forming a copolymer of 2,3,3,3-tetrafluoropropene, comprising the step of forming an emulsion polymer by contacting in a reaction zone a mixture comprising:
   1) from 1 to 90 wt percent of 2,3,3,3-tetrafluoropropene, based on the total weight of monomers;
   2) from 10 to 99 wt percent of one or more other fluoromonomers based on the total weight of monomers;
   3) from 0 to 50 wt percent of other ethylenically unsaturated monomers based on the total weight of monomers;
   4) a persulfate initiator as the primary initiator;
   5) 100 ppm to 2 wt percent, based on the weight of the copolymer solids, of one or more non-fluorinated surfactants,
   wherein no fluorosurfactants are used in the emulsion polymerization;
   wherein said contacting is carried out at a temperature of from 50° C. to 135° C., and at a pressure of from 1380 to 8275 kpa; and
   wherein said copolymer formed has a high molecular weight, having a melt viscosity of greater than 5 Kpoise.

2. The process of claim 1, wherein said copolymer contains at least 30% by weight of 2,3,3,3-tetrafluoropropene monomer units.

3. The process of claim 1, wherein said other fluoromonomers comprise vinylidene fluoride monomer units.

4. The process of claim 3, wherein the amount of said vinylidene fluoride monomer units is from 40 to 98 wt percent of the total monomer units.

5. The process of claim 1, wherein said non-fluorinated surfactant is selected from the group consisting of:
   i) non-ionic block copolymers with formula of

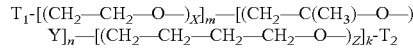

wherein, X, Y, and Z are between 2 to 200; and m, n, k are from 0 to 5, $T_1$ and $T_2$ are terminal groups selected from hydrogen, hydroxyl, carboxyl, ester, ether and/or hydrocarbon, and wherein said fluoropolymer is free of fluorosurfactants.
   ii) alkyl phosphonic acids, polyvinylphosphonic acid, polyacrylic acid, polyvinyl sulfonic acid, and the salts thereof;
   iii) alkanesulfonate selected from C7-C20 linear 1-alkanesulfonates, C7-C20 linear 2-alkanesulfonates, C7-C20 linear 1,2-alkanedisulfonates, and mixtures thereof;
   iv) alkyl sulfate surfactants having the formulae R—O—SO$_3$M and MO$_3$S—O—R—O—SO3M;
   where R is a hydrocarbon group, and M is a monovalent cation selected.

6. The process of claim 1, wherein said process occurs at from 70-120° C.

7. The process of claim 5, wherein said alkyl sulfate surfactants are selected from the group consisting of sodium laurel sulfate, potassium laurel sulfate, ammonium laurel sulfate, and mixtures thereof.

* * * * *